(12) United States Patent
Li et al.

(10) Patent No.: US 12,021,762 B2
(45) Date of Patent: *Jun. 25, 2024

(54) VIRTUAL NETWORK DEVICE

(71) Applicant: PrimeWan Limited, Causeway Bay (HK)

(72) Inventors: Ming Li, Beijing (CN); Yuan Yang Jia, Beijing (CN)

(73) Assignee: PrimeWan Limited, Causeway Bay (HK)

(*) Notice: Subject to any disclaimer, the term of this patent is extended or adjusted under 35 U.S.C. 154(b) by 43 days.

This patent is subject to a terminal disclaimer.

(21) Appl. No.: 17/666,315

(22) Filed: Feb. 7, 2022

(65) Prior Publication Data

US 2022/0158954 A1 May 19, 2022

Related U.S. Application Data

(63) Continuation of application No. 16/868,345, filed on May 6, 2020, now Pat. No. 11,245,645, which is a continuation-in-part of application No. 16/838,965, filed on Apr. 2, 2020, now Pat. No. 11,223,569.

(51) Int. Cl.
| | |
|---|---|
| *H04L 49/00* | (2022.01) |
| *H04L 47/62* | (2022.01) |
| *H04L 49/103* | (2022.01) |

(52) U.S. Cl.
CPC .......... *H04L 49/70* (2013.01); *H04L 47/6225* (2013.01); *H04L 49/103* (2013.01); *H04L 49/3045* (2013.01); *H04L 2212/00* (2013.01)

(58) Field of Classification Search
CPC ... H04L 49/70; H04L 47/6225; H04L 49/103; H04L 49/3045; H04L 2212/00
See application file for complete search history.

(56) References Cited

U.S. PATENT DOCUMENTS

| | | | |
|---|---|---|---|
| 6,850,518 B1 | 2/2005 | Khanna | |
| 8,578,106 B1 * | 11/2013 | Shapiro | ................. G06F 3/0659 711/212 |
| 8,976,794 B2 | 3/2015 | Xiong | |
| 9,590,820 B1 | 3/2017 | Shukla | |
| 9,860,011 B2 | 1/2018 | Kim et al. | |
| 10,659,358 B2 | 5/2020 | Nellikar et al. | |

(Continued)

FOREIGN PATENT DOCUMENTS

| | | |
|---|---|---|
| CN | 1207232 | 2/1999 |
| CN | 1677951 | 10/2005 |

(Continued)

OTHER PUBLICATIONS

K. Muthukrishnan et al., "A Core MPLS IP VPN Architecture," Network Working Group, Request for Comments: 2917, Core VPNs, The Internet Society, Sep. 2000, pp. 1-16.

(Continued)

*Primary Examiner* — Chi H Pham
*Assistant Examiner* — Weibin Huang

(57) ABSTRACT

A virtual network device increases the effective number of local physical ports by converting each of the local physical ports into a plurality of virtual local physical ports, and the effective number of network physical ports by converting each of the network physical ports into a plurality of virtual network physical ports.

20 Claims, 11 Drawing Sheets

(56) References Cited

U.S. PATENT DOCUMENTS

| | | | |
|---|---|---|---|
| 11,223,569 B2 | 1/2022 | Li et al. | |
| 11,245,645 B2* | 2/2022 | Li | H04L 47/6225 |
| 2003/0118036 A1 | 6/2003 | Gibson et al. | |
| 2004/0218099 A1 | 11/2004 | Washington | |
| 2007/0153697 A1* | 7/2007 | Kwan | H04L 47/627 |
| | | | 370/468 |
| 2010/0166009 A1 | 7/2010 | Huang et al. | |
| 2011/0085557 A1* | 4/2011 | Gnanasekaran | H04L 67/1097 |
| | | | 370/401 |
| 2012/0027014 A1* | 2/2012 | Mack-Crane | H04L 12/4666 |
| | | | 370/389 |
| 2012/0093034 A1* | 4/2012 | Kamath | H04L 49/30 |
| | | | 370/255 |
| 2012/0163373 A1 | 6/2012 | Lo et al. | |
| 2012/0230680 A1 | 9/2012 | Fujita et al. | |
| 2012/0287786 A1* | 11/2012 | Kamble | H04L 49/70 |
| | | | 370/235 |
| 2013/0229921 A1 | 9/2013 | Mohan et al. | |
| 2013/0322453 A1 | 12/2013 | Allan | |
| 2013/0336134 A1* | 12/2013 | Bao | H04L 41/046 |
| | | | 370/252 |
| 2014/0328158 A1 | 11/2014 | Shao | |
| 2015/0033222 A1 | 1/2015 | Hussain et al. | |
| 2015/0071122 A1 | 3/2015 | Addanki et al. | |
| 2015/0156250 A1* | 6/2015 | Varshney | H04L 67/10 |
| | | | 709/201 |
| 2016/0277245 A1 | 9/2016 | Wei | |
| 2017/0019430 A1 | 1/2017 | Cohn | |
| 2017/0078198 A1 | 3/2017 | Nellikar et al. | |
| 2017/0163900 A1 | 6/2017 | Gaetje et al. | |
| 2018/0083698 A1 | 3/2018 | Hino et al. | |
| 2019/0020537 A1 | 1/2019 | Sharma et al. | |

FOREIGN PATENT DOCUMENTS

| | | |
|---|---|---|
| CN | 1852285 | 10/2006 |
| CN | 1946053 | 4/2007 |
| CN | 101286922 | 10/2008 |
| CN | 102238091 | 11/2011 |
| CN | 103107932 | 5/2013 |
| CN | 103209110 | 7/2013 |
| CN | 103326940 | 9/2013 |
| CN | 103428061 | 12/2013 |
| CN | 105978656 | 9/2016 |
| CN | 107135133 | 9/2017 |
| CN | 110213040 | 9/2019 |
| JP | 2010232818 | 10/2010 |
| JP | 2011049656 | 3/2011 |
| JP | 2015119233 | 6/2015 |
| JP | 2017152814 | 8/2017 |
| JP | 2018098714 | 6/2018 |
| KR | 20060059877 | 6/2006 |
| WO | 2009051179 | 4/2009 |
| WO | 2015127643 | 9/2015 |

OTHER PUBLICATIONS

Ren Jin-qiu et al., "Implementation of Inter-AS BGP/MPLS VPN in High-performance Router," Computer Engineering, vol. 35, No. 3, Feb. 2009, pp. 126-129.

Chen Yingying et al., "Research on Virtual Router and its Application in BGP/MPLS VPN," Computer Engineering, vol. 33, No. 1, Jan. 2007, pp. 108-111.

* cited by examiner

VIRTUAL NETWORK DEVICE

RELATED APPLICATION

The present application is a continuation of U.S. patent application Ser. No. 16/868,345, filed on May 6, 2020 (ALGOBLU-P013.CIP), which claims priority to U.S. patent application Ser. No. 16/838,965, filed on Apr. 2, 2020, the disclosure and content of each of which are fully incorporated herein by reference in their entireties.

BACKGROUND OF THE INVENTION

1. Field of the Invention

The present application relates to the field of computer networks and, in particular, to a virtual network device.

2. Description of the Related Art

A wide area network (WAN) is an interconnected web of network devices that typically interconnects local area networks or metropolitan area networks over a large geographical area, such as across the state or across the country. WANs allow remotely located computers to communicate with each other via the network devices.

Conventional network devices typically include one or more physical network ports that operate at a predetermined fixed data rate, such as for example, 10/100/1000 Mbps (megabits per second), 10 Gbps (gigabits per second), 40 Gbps, and 100 Gbps connection. As part of enabling communication between the computer systems over a network, conventional network devices negotiate the transfer speed of a network port and, during that process, the transfer speed of the network port is fixed.

One of the disadvantages of conventional network devices is that there is often a requirement for more physical ports than are available, which results in reduced service or costly upgrades. As a result, there is a need for an approach to accommodating the increasing need for ports.

SUMMARY OF THE INVENTION

The present invention provides a virtual network device with virtual ports that effectively increase the number of available physical ports. The virtual network device includes a framing circuit that receives a plurality of input frames, examines the plurality of input frames to determine a frame type for each input frame, and determines a virtual exit device associated with each input frame based on the frame type. The framing circuit also encapsulates the plurality of input frames to form a plurality of first encapsulated frames. Each virtual exit device has a receive virtual port. The plurality of first encapsulated frames have a plurality of headers. The plurality of headers identifies a plurality of virtual exit devices that are associated with the plurality of input frames. In addition, the virtual network device includes a plurality of transmit virtual ports that are coupled to the framing circuit. The plurality of transmit virtual ports determine a plurality of next hops in a virtual network for the plurality of first encapsulated frames based on the virtual exit devices in the headers of the plurality of first encapsulated frames. The plurality of transmit virtual ports additionally encapsulate the plurality of first encapsulated frames to form a plurality of second encapsulated frames. Each second encapsulated frame has a header. The header of a second encapsulated frame identifies a next hop of the second encapsulated frame based on a next hop of a first encapsulated frame, and the receive virtual port of the associated virtual exit device of an input frame. The transmit virtual ports include a first portion of a memory. Further, the virtual network device includes a transmit virtual switch coupled to the plurality of transmit virtual ports. The transmit virtual switch selectively couples the transmit virtual ports to a network physical port.

The present invention also includes a method of operating a virtual network device. The method includes receiving a plurality of input frames, examining the plurality of input frames to determine a frame type for each input frame, and determining a virtual exit device associated with each input frame based on the frame type. Each virtual exit device has a receive virtual port. The method also includes encapsulating the plurality of input frames to form a plurality of first encapsulated frames. The plurality of first encapsulated frames has a plurality of headers. The plurality of headers identifies a plurality of virtual exit devices associated with the plurality of input frames. In addition, the method includes determining a plurality of next hops in a virtual network for the plurality of first encapsulated frames based on the virtual exit devices in the headers of the plurality of first encapsulated frames. Further, the method includes encapsulating a plurality of first encapsulated frames in a plurality of transmit virtual ports to form a plurality of second encapsulated frames. Each second encapsulated frame has a header. The header of a second encapsulated frame identifies a next hop of the second encapsulated frame based on a next hop of a first encapsulated frame, and the receive virtual port of the associated virtual exit device of an input frame. The transmit virtual ports include a first portion of a shared memory. The method additionally includes selectively coupling the transmit virtual ports to a network physical port.

The present invention also provides a non-transitory computer-readable storage medium having embedded therein program instructions, which when executed by a processor causes the processor to execute a method of operating a virtual network device. The method includes receiving a plurality of input frames, examining the plurality of input frames to determine a frame type for each input frame, and determining a virtual exit device associated with each input frame based on the frame type. Each virtual exit device has a receive virtual port. The method also includes encapsulating the plurality of input frames to form a plurality of first encapsulated frames. The plurality of first encapsulated frames has a plurality of headers. The plurality of headers identifies a plurality of virtual exit devices associated with the plurality of input frames. In addition, the method includes determining a plurality of next hops in a virtual network for the plurality of first encapsulated frames based on the virtual exit devices in the headers of the plurality of first encapsulated frames. Further, the method includes encapsulating a plurality of first encapsulated frames in a plurality of transmit virtual ports to form a plurality of second encapsulated frames. Each second encapsulated frame has a header. The header of a second encapsulated frame identifies a next hop of the second encapsulated frame based on a next hop of a first encapsulated frame, and the receive virtual port of the associated virtual exit device of an input frame. The method additionally includes selectively coupling the transmit virtual ports to a network physical port.

A better understanding of the features and advantages of the present invention will be obtained by reference to the following detailed description and accompanying drawings which set forth an illustrative embodiment in which the principals of the invention are utilized.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1:
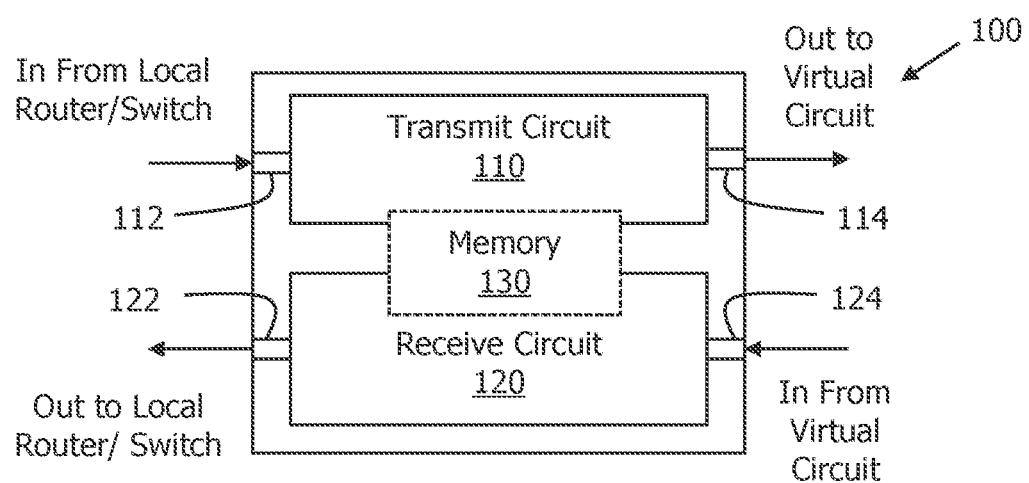
FIG. 1 is a block diagram illustrating an example of a virtual network device 100 in accordance with the present invention.

FIG. 1 shows a block diagram that illustrates an example of a virtual network device 100 in accordance with the present invention. As described in greater detail below, the effective number of local physical ports in virtual network device 100 are increased by converting one or more of the local physical ports into a plurality of virtual local physical ports, and the effective number of network physical ports are increased by converting one or more of the network physical ports into a plurality of virtual network physical ports.

Virtual network device 100 is a component in a virtual network that interconnects a local router/switch with a remote router/switch. The virtual network includes a virtual network device 100, which functions as a virtual entry device into the virtual network, that is coupled to a local router/switch, and a virtual network device 100, which functions as a virtual exit device from the virtual network, that is coupled to a remote router/switch.

As shown in FIG. 1, virtual network device 100 includes a transmit circuit 110 that has a number of local physical ports 112 that each receive frames of data, such as set-top box (STB), personal computer (PC), and video frames of data, from a local network device, such as a router/switch, and a number of network physical ports 114 that each output frames of data to the virtual network.

As further shown in FIG. 1, virtual network device 100 also includes a receive circuit 120 that has a number of local physical ports 122 that each output frames of data to a local network device, such as a router/switch, and a number of network physical ports 124 that each receive frames of data from the virtual network. In one embodiment, one or more of the local physical ports 112 and 122 can be shared between the transmit and receive circuits 110 and 120, and one or more of the network physical ports 114 and 124 can be shared between the transmit and receive circuits 110 and 120.

In addition, virtual network device 100 includes a shared memory 130 that is coupled to both the transmit circuit 110 and the receive circuit 120. Shared memory 130 includes a transmit queue that temporarily stores frames of data to be output to the virtual network, and a receive queue that temporarily stores frames of data received from the virtual network.

Figure 2A:
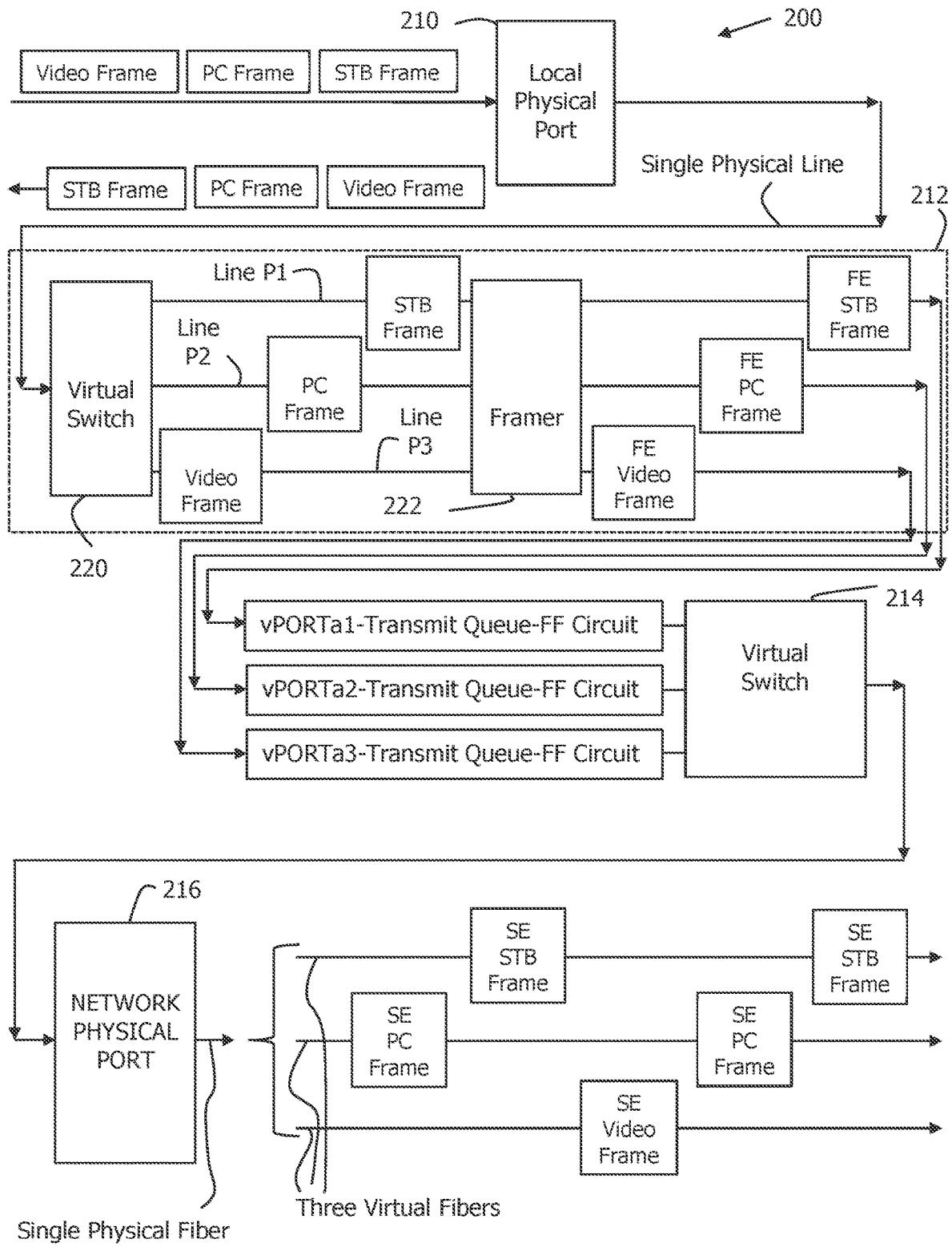
FIG. 2A is a block diagram illustrating an example of a transmit circuit 200 in accordance with the present invention.

FIG. 2A shows a block diagram that illustrates an example of a transmit circuit 200 in accordance with the present invention. As shown in FIG. 2A, transmit circuit 200 includes a local physical port 210, a framing circuit 212 that is coupled to local physical port 210, and a number of transmit virtual ports vPORTa1-vPORTan that are coupled to framing circuit 212.

Each transmit virtual port vPORTa, in turn, includes a transmit queue and a transmit frame formatting circuit. In addition, transmit circuit 200 also includes a transmit virtual switch 214 that is coupled to each of the transmit virtual ports vPORTa, and a network physical port 216 that is coupled to transmit virtual switch 214.

Figure 3A:
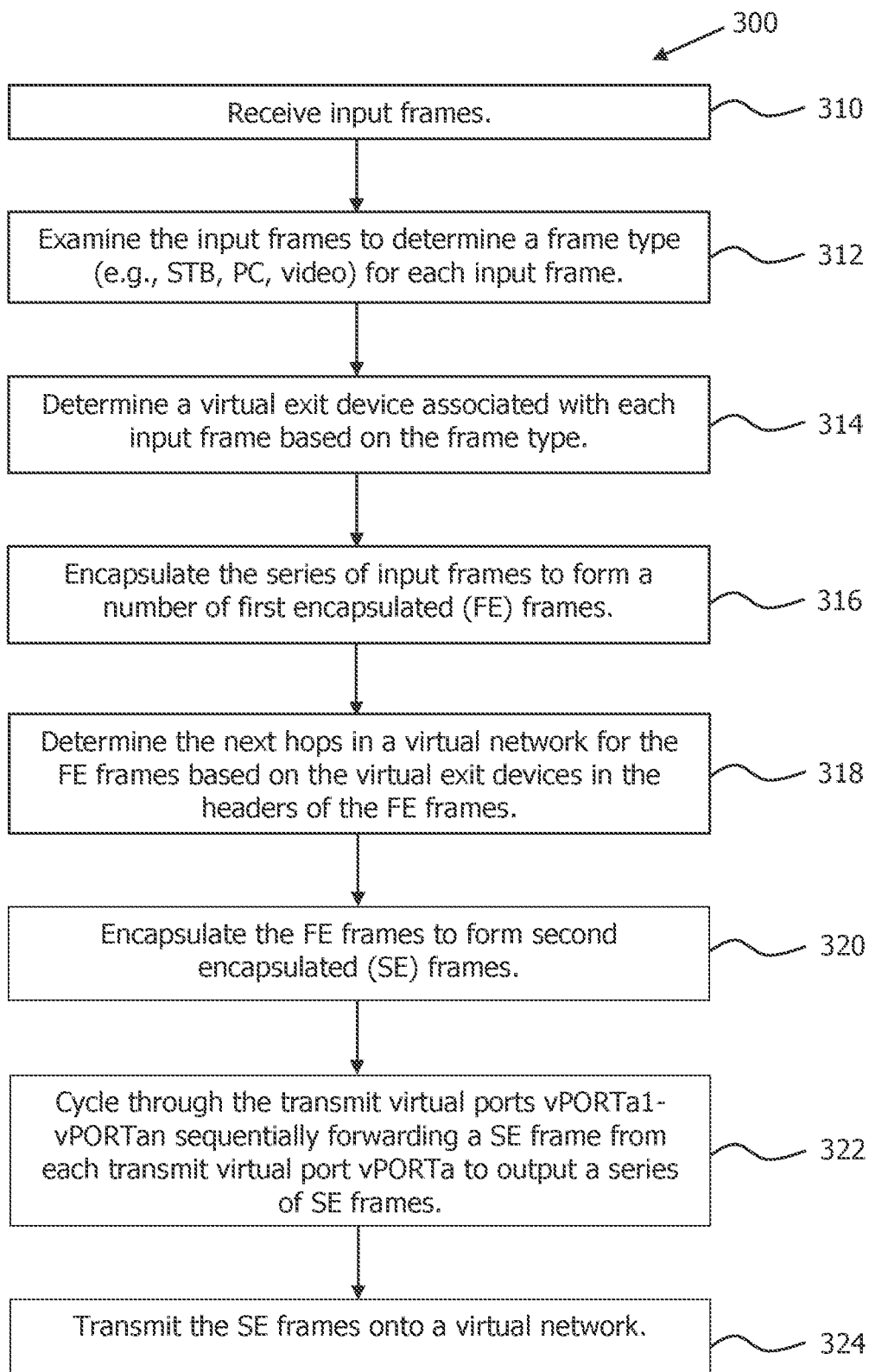
FIG. 3A is a flow chart illustrating an example of a method 300 of operating transmit circuit 200 in accordance with the present invention.

FIG. 3A shows a flow chart that illustrates an example of a method 300 of operating transmit circuit 200 in accordance with the present invention. As shown in FIG. 3A, method 300 begins at 310 with framing circuit 212 receiving a series of input frames from local physical port 210. Method 300 next moves to 312 to examine the series of input frames to determine a frame type (e.g., STB, PC, video) for each input frame, and then moves to 314 to determine a virtual exit device that is associated with each input frame based on the frame type. Each virtual exit device, in turn, has a number of receive virtual ports.

Following this, method 300 moves to 316 where framing circuit 212 encapsulates the series of input frames to form a number of first encapsulated (FE) frames. The FE frames have headers that identify the virtual exit devices that are associated with the series of input frames.

After this, method 300 moves to 318 where the transmit virtual ports vPORTa1-vPORTan determine the next hops in a virtual network for the FE frames based on the virtual exit devices in the headers of the FE frames. Next, method 300 moves to 320 where the transmit virtual ports vPORTa1-vPORTan encapsulate the FE frames to form second encapsulated (SE) frames. Each SE frame has a header that identifies a next hop of the SE frame based on the next hop of a FE frame. The header also identifies the receive virtual port of the associated virtual exit device of an input frame. In addition, the transmit virtual ports occupy a first portion of a shared memory.

Following this, method 300 moves to 322 where transmit virtual switch 214 cycles through the transmit virtual ports vPORTa1-vPORTan sequentially forwarding a SE frame from each transmit virtual port vPORTa in a fixed repeating order to output a sequence of SE frames. For example, virtual switch 214 can output a sequence of SE frames where the first SE frame is from vPORT1, the second frame is from vPORT2, the third frame is from vPORT3, and a fourth frame is again from vPORT1.

If a transmit virtual port vPORTa is empty or partially full, then no frame is generated. For example, if transmit virtual port vPORT2 is empty, then network physical port 216 outputs a frame sequence that includes frame 1, no frame, frame 3. Method 300 next moves to 324 where network physical port 216 transmits the sequence of SE frames onto the virtual network.

Figure 3B:
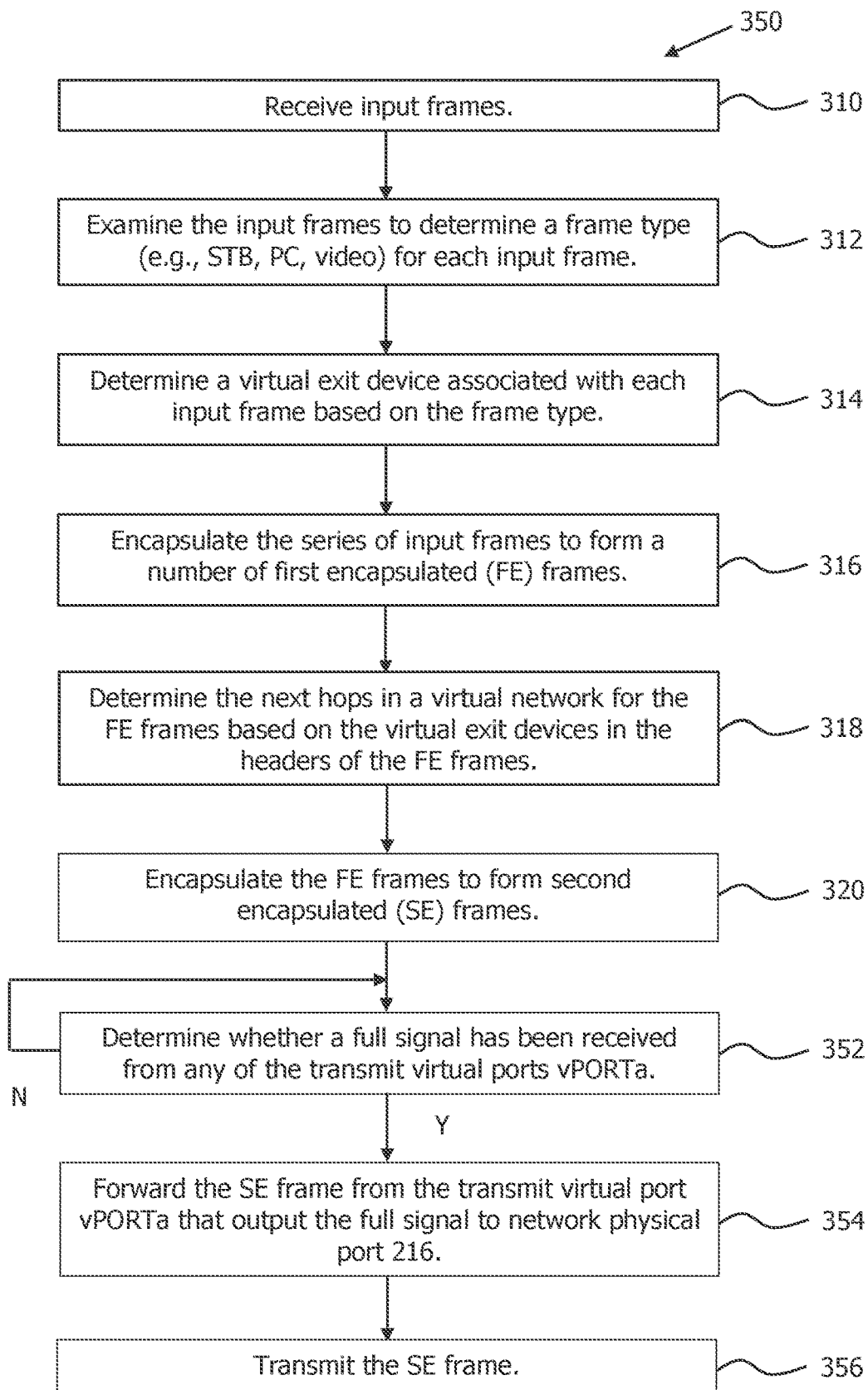
FIG. 3B is a flow chart illustrating an example of a method 350 of operating transmit circuit 200 in accordance with the present invention.

FIG. 3B shows a flow chart that illustrates an example of a method 350 of operating transmit circuit 200 in accordance with an alternate embodiment of the present invention. Method 350 is similar to method 300 and, as a result, utilizes the same reference numerals to designate the elements that are common to both methods.

As shown in FIG. 3B, method 350 first diverges from method 300 at 352 where virtual switch 214 determines whether a full signal has been received from any of the transmit virtual ports vPORTa. The full signal indicates that the SE frame in a transmit virtual port vPORTa is ready to be transmitted. When virtual switch 214 detects a full signal from a transmit virtual port vPORTa, method 350 moves to 354 where virtual switch 214 forwards the SE frame from the transmit virtual port vPORTa that output the full signal to network physical port 216.

For example, virtual switch 214 could sequentially receive a full signal from transmit virtual port vPORTa1, transmit virtual port vPORTa2, and transmit virtual port vPORTa3. In this case, virtual switch 214 outputs a sequence of SE frames where the first SE frame is from transmit virtual port vPORT1, the second frame is from transmit virtual port vPORT2, and the third frame is from transmit virtual port vPORT3.

Alternately, one of the sources (e.g., the STB, PC, video sources) can have a data rate that is much faster than the data rates of the other sources (e.g., STB, PC, video sources) which, in turn, causes one transmit virtual port vPORTa to output a full signal much more frequently than the other transmit virtual ports vPORTa.

For example, if network physical port 216 transmits frames at a frame rate of five frames per second, transmit virtual port vPORTa2 outputs frames at a rate that is 3× faster than each of the frame rates of transmit virtual ports vPORTa1 and vPORTa3, transmit virtual port vPORTa2 signals full three times before the other ports, and transmit virtual port vPORTa1 signals before vPORTa3 signals, then virtual switch 214 forwards a sequence of frames that includes a first frame from the transmit virtual port vPORT2, a second frame from transmit virtual port vPORT2, a third frame from transmit virtual port vPORT2, a fourth frame from transmit virtual port vPORT1, and a fifth frame from transmit virtual port vPORT3.

In addition to a first-in first-out approach where the order of receiving a full signal determines the order that a SE frame is output from a transmit virtual port vPORTa by virtual switch 214, the transmit virtual ports vPORTa-vPORTan can alternately include a priority scheme that allows frames to be forwarded from a transmit virtual port vPORTa to a network physical port in any amount and in any order.

Referring back to FIG. 3B, after virtual switch 214 forwards the SE frame from the transmit virtual port vPORTa that output the full signal to network physical port 216, method 350 moves to 356 where network physical port 216 transmits the SE frame. In method 300, the frame to be output is predictable, whereas the frame to be output in method 350 is not predictable, although a priority scheme provides a level of predictability.

Referring again to the FIG. 2A example, framing circuit 212 includes a virtual switch 220 and a framer 222 that is coupled to virtual switch 220. Virtual switch 220 detects a type of input frame (e.g., STB, PC, video), determines a route for a frame to a virtual port vPORTa that corresponds with the type of frame from a static forwarding table, and outputs the frame towards the virtual port vPORTa.

In the present example, virtual switch 220 receives the STB frame transmitted by a local source router/switch, and detects the received frame to be a STB frame from the source and/or destination MAC address in the STB frame. Switch 220 then outputs the STB frame on a first virtual port line P1 routed towards virtual port vPORTa1, which was pre-selected to receive STB frames.

Similarly, virtual switch 220 receives the PC frame transmitted by the local source router/switch, and detects the received frame to be a PC frame from the source and/or destination MAC address in the PC frame. Switch 220 then outputs the PC frame on a second virtual port line P2 routed towards virtual port vPORTa2, which was pre-selected to receive PC frames.

Virtual switch 220 also receives the video frame transmitted by the local router/switch, detects the received frame to be a video frame from the source and/or destination MAC address in the video frame, and then outputs the video frame on a third virtual port line P3 routed towards virtual port vPORTa3, which was pre-selected to receive video frames.

Framer 222 receives the STB frame on virtual port line P1, encapsulates the STB frame to form a first encapsulated (FE) STB frame, and then forwards the FE STB frame to the transmit queue of virtual port vPORTa1. Similarly, framer 222 receives the PC frame on virtual port line P2, encapsulates the PC frame to form a first encapsulated (FE) PC frame, and then forwards the FE PC frame to the transmit queue of virtual port vPORTa2. Framer 222 also receives the video frame on virtual port line P3, encapsulates the video frame to form a first encapsulated (FE) video frame, and then forwards the FE video frame to the transmit queue of virtual port vPORTa3.

Framer 222 can utilize a conventional protocol, such as the provider backbone bridge-traffic engineering (PBB-TE) protocol or the transport multiprotocol label switching (T-MPLS) protocol, to generate the encapsulated frames. In addition, the FE STB frame, the FE PC frame, and the FE video frame each has a header which has a number of fields that include an identification of the virtual exit device.

For example, the header of a FE frame can include an exit address field for the MAC address of the virtual exit device, an I-Tag field, or a similar field. The header can also include other fields, such as the MAC address of the virtual entry device. In the present example, the MAC address of the virtual exit device is administratively provided to the virtual entry device.

The frame formatting circuit in virtual port vPORTa1 of transmit circuit 200 receives the FE STB frame, determines a next hop in the virtual network for the FE STB frame from a static forwarding table based on the identification of the virtual exit device, such as the MAC address of the virtual exit device, in the header of the FE STB frame, and encapsulates the FE STB frame to form a second encapsulated (SE) STB frame.

Similarly, the frame formatting circuit in virtual port vPORTa2 of transmit circuit 200 receives the FE PC frame, determines a next hop in the virtual network for the FE PC frame from the static forwarding table based on the identification of the virtual exit device, such as the MAC address of the virtual exit device, in the header of the FE PC frame, and encapsulates the FE PC frame to form a second encapsulated (SE) PC frame.

In addition, the frame formatting circuit in virtual port vPORTa3 of transmit circuit 200 receives the FE video frame, determines a next hop in the virtual network for the FE video frame from the static forwarding table based on the identification of the virtual exit device, such as the MAC address of the virtual exit device, in the header of the FE video frame, and encapsulates the FE video frame to form a second encapsulated (SE) video frame.

The SE STB frame, the SE PC frame, and the SE video frame each includes a header with a next hop field that identifies the MAC address of the next hop in the virtual network, a source field Src_vID that identifies the virtual port number of the virtual entry device, and a destination field Dst_vID that identifies a virtual port number of the virtual exit device that corresponds with the virtual port number of the virtual entry device. In the present example, the source field Src_vID for the SE STB frame is virtual port vPORTa1. Other fields, such as a last hop field, can also be included.

Further, virtual switch 214 cycles through the virtual ports vPORTa1-vPORTan sequentially forwarding a second encapsulated (SE) frame from each virtual port vPORTa to output a series of SE frames to physical port 216. In the present example, switch 214 forwards a SE STB frame from virtual port vPORTa1 to physical port 216, followed by forwarding a SE PC frame from virtual port vPORTa2 to physical port 216, followed by forwarding a SE video frame from virtual port vPORTa3 to physical port 216, followed by forwarding a SE STB frame from virtual port vPORTa1 to physical port 216, and continuing in the same manner, with physical port 216 outputting the frames. Although FIG. 2 illustrates transmit circuit 200 as receiving and operating with input from a single local router/switch, transmit circuit 200 can alternately receive and operate with input from multiple router/switches.

Figure 2B:
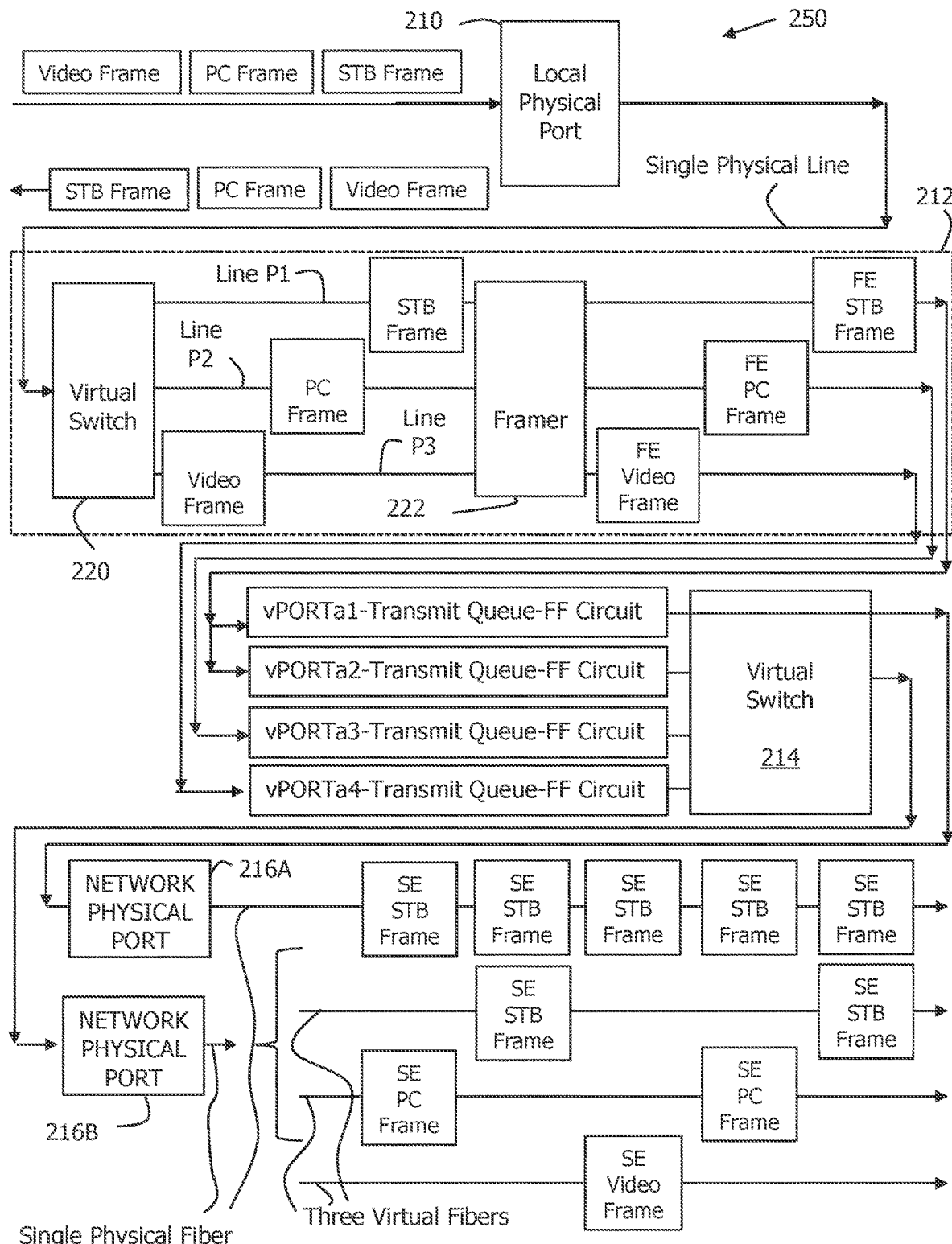
FIG. 2B is a block diagram illustrating an example of a transmit circuit 250 in accordance with the present invention.

FIG. 2B shows a block diagram that illustrates an example of a transmit circuit 250 in accordance with the present invention. Transmit circuit 250 is similar to transmit circuit 200 and, as a result, utilizes the same reference numerals to designate the elements that are common to both transmit circuit 200 and transmit circuit 250.

As shown in FIG. 2B, transmit circuit 250 differs from transmit circuit 200 in that transmit circuit 250 includes a first network physical port 216A and a second network physical port 216B, both of which are coupled to virtual switch 214. In addition, virtual switch 214 provides a continuous connection between transmit virtual port vPORTa1 and network physical port 216A. Further, an additional transmit virtual port vPORTa4 is shown.

Transmit circuit 250 operates substantially the same as transmit circuit 200, except that one or more of the sources (e.g., STB, PC, or video source) outputs frames of data at a frame rate that is greater than the maximum frame rate of the network physical ports 216A and 216B. For example, each of the network physical ports 216A and 216B can have a maximum frame rate of five frames per second.

In the FIG. 2B example, a set-top box outputs seven STB frames per second, while a personal computer outputs two PC frames per second and a video device outputs one video frame per second. (The numbers cited are for illustration purposes only.) As shown in FIG. 2B, five of the seven STB frames are transmitted from network physical port 216A, while the remaining two STB frames, two PC frames, and one video frame are transmitted from network physical port 216B in the manner illustrated by methods 300 and 350. One the advantages of transmit circuit 250 is that transmit circuit 250 can handle incoming frame rates that are greater than the maximum frame rate of the network physical ports.

Figure 4:
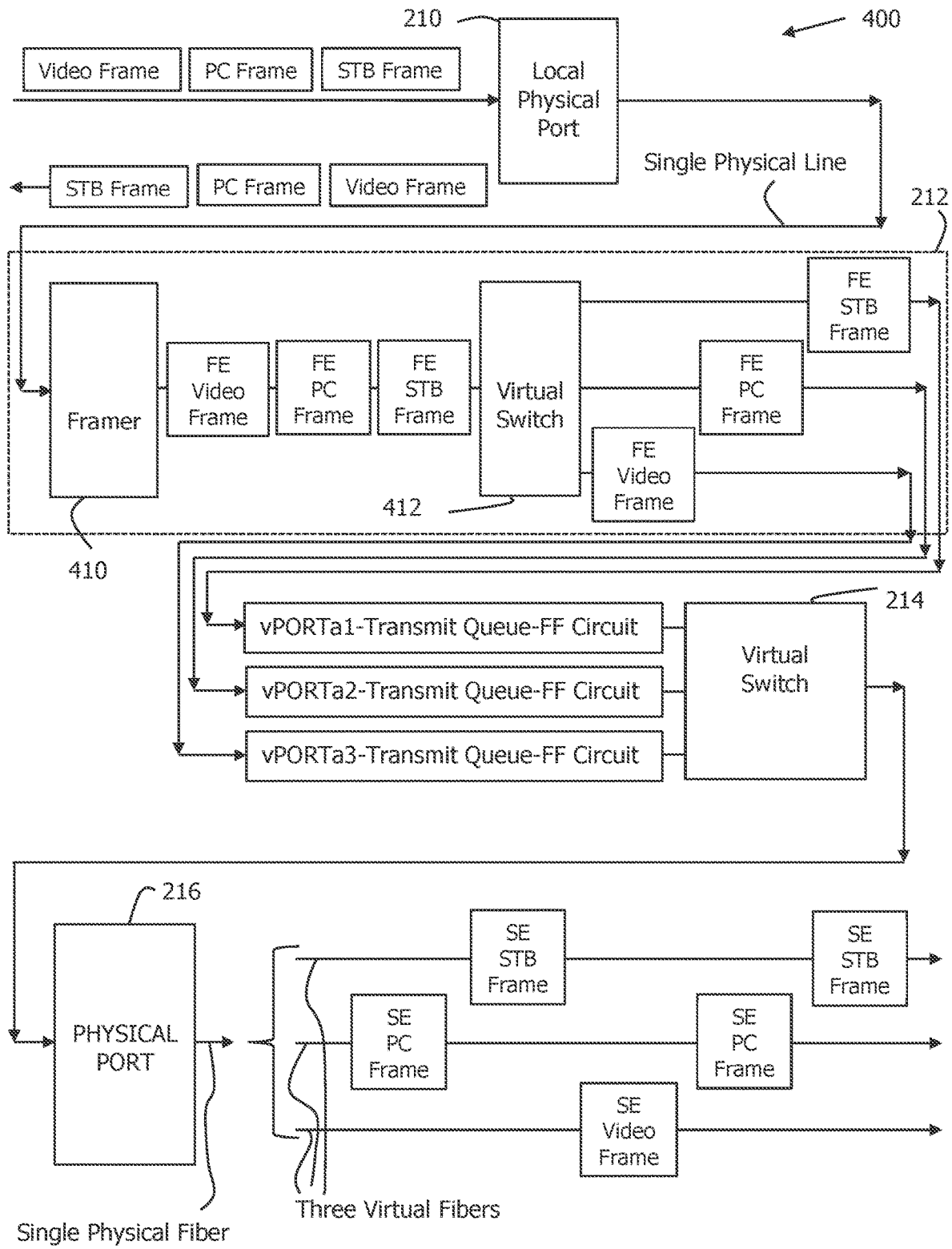
FIG. 4 is a block diagram illustrating an example of a transmit circuit 400 in accordance with an alternate embodiment of the present invention.

FIG. 4 shows a block diagram that illustrates an example of a transmit circuit 400 in accordance with an alternate embodiment of the present invention. Transmit circuit 400 is similar to transmit circuit 200 and, as a result, utilizes the same reference numerals to designate the structures that are common to both circuits.

As shown in FIG. 4, transmit circuit 400 differs from transmit circuit 200 in that framing circuit 212 of transmit circuit 400 utilizes a serial-to-serial framer 410 followed by a serial-to-parallel virtual switch 412 that is coupled to the virtual ports vPORTa1-vPORTan in lieu of virtual switch 220 followed by framer 222.

In a further alternate embodiment, framer 410 and virtual switch 412 of transmit circuit 400 can be physically separated, with framer 410 being incorporated into a local router/switch.

Figure 5:
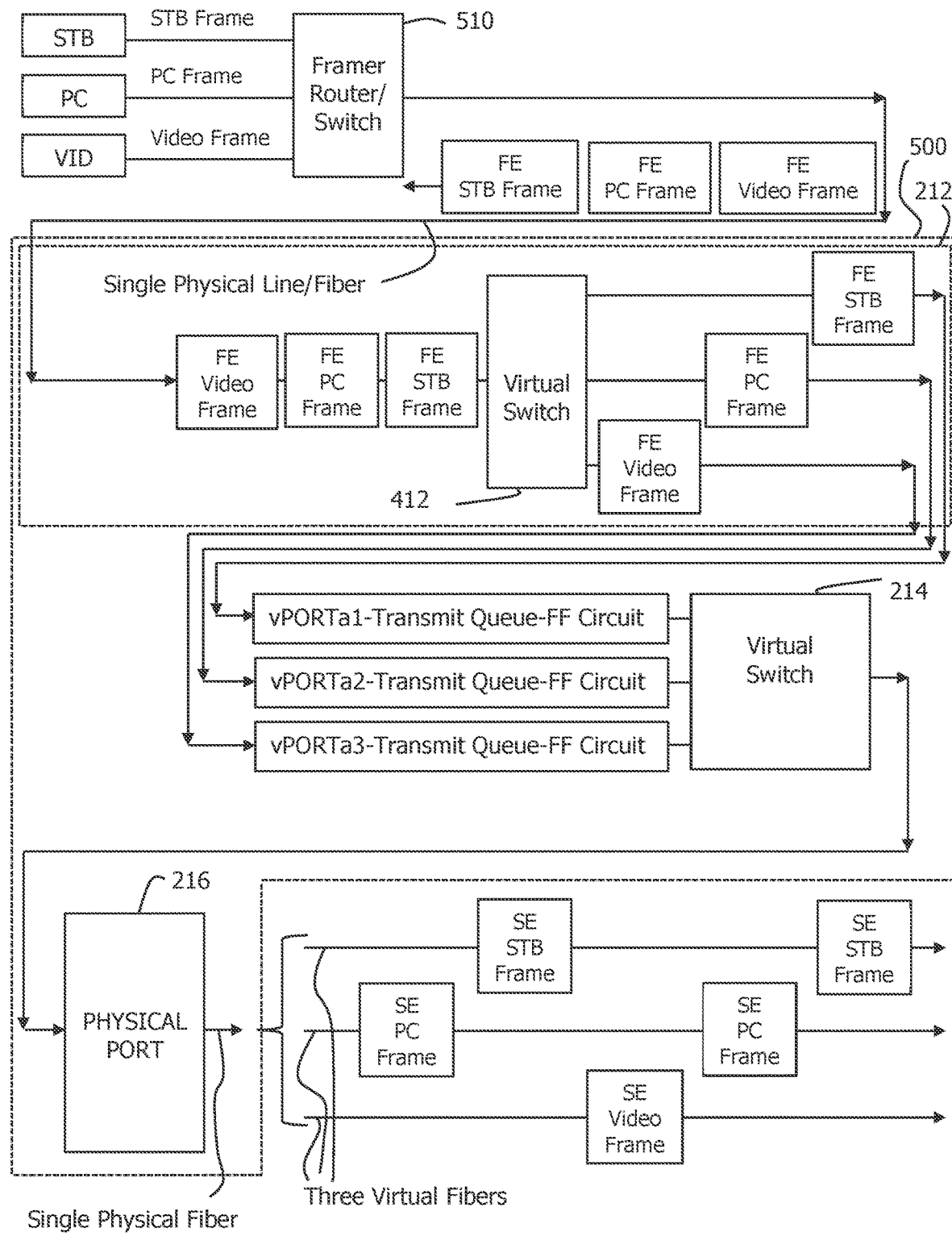
FIG. 5 shows a block diagram that illustrates an example of a transmit circuit 500 in accordance with an alternate embodiment of the present invention.

FIG. 5 shows a block diagram that illustrates an example of a transmit circuit 500 in accordance with the present invention. Transmit circuit 500 is similar to transmit circuit 400 and, as a result, utilizes the same reference numerals to designate the structures that are common to both circuit 400 and circuit 500. As shown in the example illustrated in FIG. 5, a local framer router/switch 510 is utilized with transmit circuit 500 in lieu of a local router/switch that receives and outputs STB, PC, and video frames.

Figure 6:
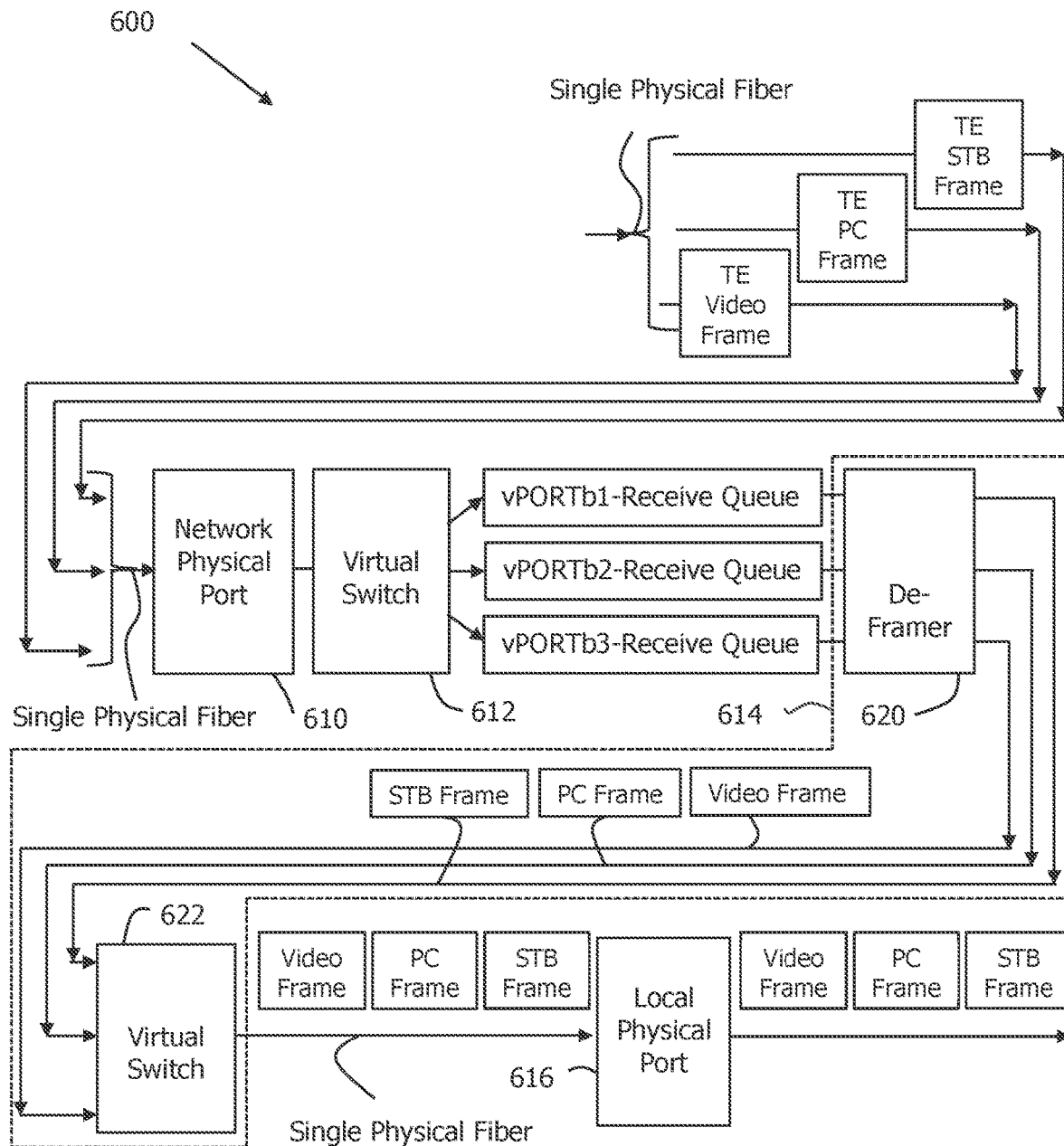
FIG. 6 is a block diagram illustrating an example of a receive circuit 600 in accordance with the present invention.

FIG. 6 shows a block diagram that illustrates an example of a receive circuit 600 in accordance with the present invention. As shown in FIG. 6, receive circuit 600 includes a network physical port 610 and a receive virtual switch 612 that is coupled to network physical port 610. Receive circuit 600 also includes a number of receive virtual ports vPORTb1-vPORTbn that are coupled to switch 612. Each receive virtual port vPORTb, in turn, includes a receive queue and a receive frame formatting circuit. Receive circuit 600 further includes a de-framing circuit 614 that is coupled to each of the receive virtual ports vPORTb, and a local physical port 616 that is coupled to de-framing circuit 614.

Figure 7:
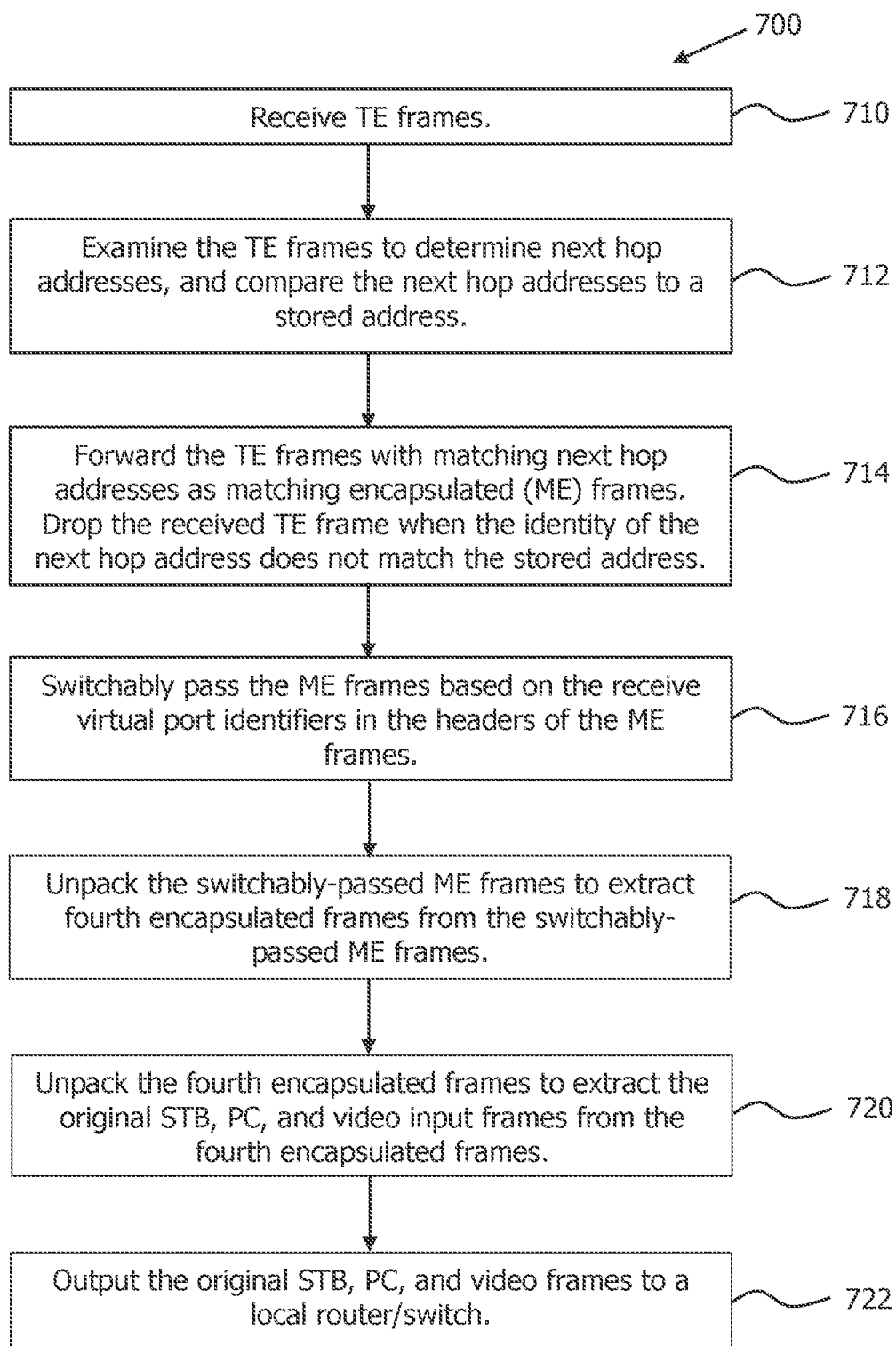
FIG. 7 shows a flow chart illustrating an example of a method 700 of operating receive circuit 600 in accordance with the present invention.

FIG. 7 shows a flow chart that illustrates an example of a method 700 of operating receive circuit 600 in accordance with the present invention. As shown in FIG. 7, method 700 begins at 710 with network physical port 610 receiving a series of third encapsulated (TE) frames from the virtual network. The TE frames have headers that include next hop addresses and receive virtual port identifiers.

Next, method 700 moves to 712 where network physical port 610 examines the TE frames to determine next hop addresses, and compares the next hop addresses to a stored address. After this, method 700 moves to 714 where network physical port 610 forwards the TE frames with matching next hop addresses as matching encapsulated (ME) frames. In addition, port 610 drops the received TE frame when the identity of the next hop address does not match the stored address.

After this, method 700 moves to 716 where receive virtual switch 612 switchably passes the ME frames based on the receive virtual port identifiers in the headers of the ME frames. Method 700 then moves to 718 where the receive virtual ports vPORTb1-vPORTbn unpack the switchably-passed ME frames to extract fourth encapsulated frames from the switchably-passed ME frames such that each receive virtual port vPORTb unpacks a ME frame to extract a fourth encapsulated frame. The receive virtual ports occupy a second portion of the shared memory.

Following this, method 700 moves to 720 where de-framing circuit 614 unpacks the fourth encapsulated frames to extract the original STB, PC, and video input frames from the fourth encapsulated frames. The original STB, PC, and video input frames, which are from a remote router/switch, have a number of frame types. Further, each input frame has a header that identifies a destination router/switch. Method 700 then moves to 722 where de-framing circuit 614 forwards the STB, PC, and video frames to local physical port 616, which outputs the original STB, PC, and video frames to a local router/switch.

In the present example, virtual switch 612 receives a ME STB frame from network physical port 610, and determines that the destination virtual port is virtual port vPORTb1 from the destination virtual port number Dst_vID in the header of the ME STB frame. In addition, switch 612 determines a route to virtual port vPORTb1 from the static forwarding table, and then outputs the ME STB frame on a first virtual port line routed towards virtual port vPORTb1.

Similarly, virtual switch 612 receives a ME PC frame from network physical port 610, and determines that the destination virtual port is virtual port vPORTb2 from the destination virtual port number Dst_vID in the header of the ME PC frame. Further, switch 612 determines a route to virtual port vPORTb2 from the static forwarding table, and then outputs the ME PC frame on a second virtual port line routed towards virtual port vPORTb2.

In addition, virtual switch 612 receives a ME video frame from network physical port 610, and determines that the destination virtual port is virtual port vPORTb3 from the destination virtual port number Dst_vID in the header of the ME video frame. Switch 612 determines a route to virtual port vPORTb3 from the static forwarding table, and then outputs the ME video frame on a third virtual port line routed towards virtual port vPORTb3.

The virtual ports vPORTb1-vPORTbn receive the ME frames, and unpack the ME frames to extract the fourth encapsulated frames, such as a fourth encapsulated STB frame, a fourth encapsulated PC frame, and a fourth encapsulated video frame, from the ME frames. In the FIG. 6 example, the receive queue of a first virtual port vPORTb1 receives a ME STB frame, while the frame formatting circuit of virtual port vPORTb1 unpacks the ME STB frame to extract the fourth encapsulated STB frame, which has a header that includes the identity of the virtual exit device.

Similarly, the receive queue of a second virtual port vPORTb2 receives a ME PC frame, while the frame formatting circuit of virtual port vPORTb2 unpacks the ME PC frame to extract the fourth encapsulated PC frame, which has a header that includes the identity of the virtual exit device. In addition, the receive queue of a third virtual port vPORTb3 receives a ME video frame, while the frame formatting circuit of virtual port vPORTb3 unpacks the ME video frame to extract the fourth encapsulated video frame, which has a header that includes the identity of the virtual exit device.

De-framing circuit 614 receives the plurality of fourth encapsulated frames, and extracts the original STB, PC, and video input frames from the fourth encapsulated frames. The input frames have a number of frame types, e.g., STB, PC, video. Each input frame has a header that includes the identity of a destination router/switch. For each received fourth encapsulated frame, de-framing circuit 614 unpacks a fourth encapsulated frame to extract an input frame, determines an identity of a destination router/switch from the header of the input frame, and outputs the input frame to local physical port 616, which outputs the input frame to the destination router/switch.

As shown in FIG. 6, de-framing circuit 614 includes a de-framer 620 and a virtual switch 622 that is coupled to de-framer 620. In operation, de-framer 620 receives the fourth encapsulated frames from the plurality of receive virtual ports vPORTb1-vPORTbn, and unpacks the fourth encapsulated frames to extract the original input frames, e.g., the STB frame, the PC frame, and the video frame, and forwards the STB frame, the PC frame, and the video frame to virtual switch 622.

In the FIG. 6 example, de-framer 620 receives the fourth encapsulated STB frame from receive virtual port vPORTb1, unpacks the fourth encapsulated frame to extract the STB frame, and forwards the STB frame to virtual switch 622. Similarly, de-framer 620 receives the fourth encapsulated PC frame from receive virtual port vPORTb2, unpacks the fourth encapsulated frame to extract the PC frame, and forwards the PC frame to virtual switch 622. In addition, de-framer 620 receives the fourth encapsulated video frame from receive virtual port vPORTb3, unpacks the fourth encapsulated frame to extract the video frame, and forwards the video frame to virtual switch 622. De-framer 620 can utilize the same or different protocol as framer 222.

Virtual switch 622 cycles through the outputs of de-framer 620 sequentially receiving and forwarding output frames to local physical port 616. In the present example, virtual switch 622 receives the STB frame from de-framer 620, detects the MAC address of a destination router/switch, and outputs the STB frame to local physical port 616. Similarly, virtual switch 622 receives the PC frame from de-framer 620, detects the MAC address of a destination router/switch, and outputs the PC frame to local physical port 616. In addition, virtual switch 622 receives the video frame from de-framer 620, detects the MAC address of a destination router/switch, and outputs the video frame to local physical port 616. Local physical port 616, in turn, outputs the frames to a local router/switch.

The FIG. 6 example illustrates de-framing circuit 614 with a parallel-to-parallel de-framer 620 followed by a parallel-to-serial virtual switch 622. De-framing circuit 614 can be alternately realized with other circuit arrangements. For example, de-framing circuit 614 can be implemented with a serial-to-parallel virtual switch that is coupled to the virtual ports vPORTb1-vPORTbn followed by a serial-to-serial framer.

Figure 8:
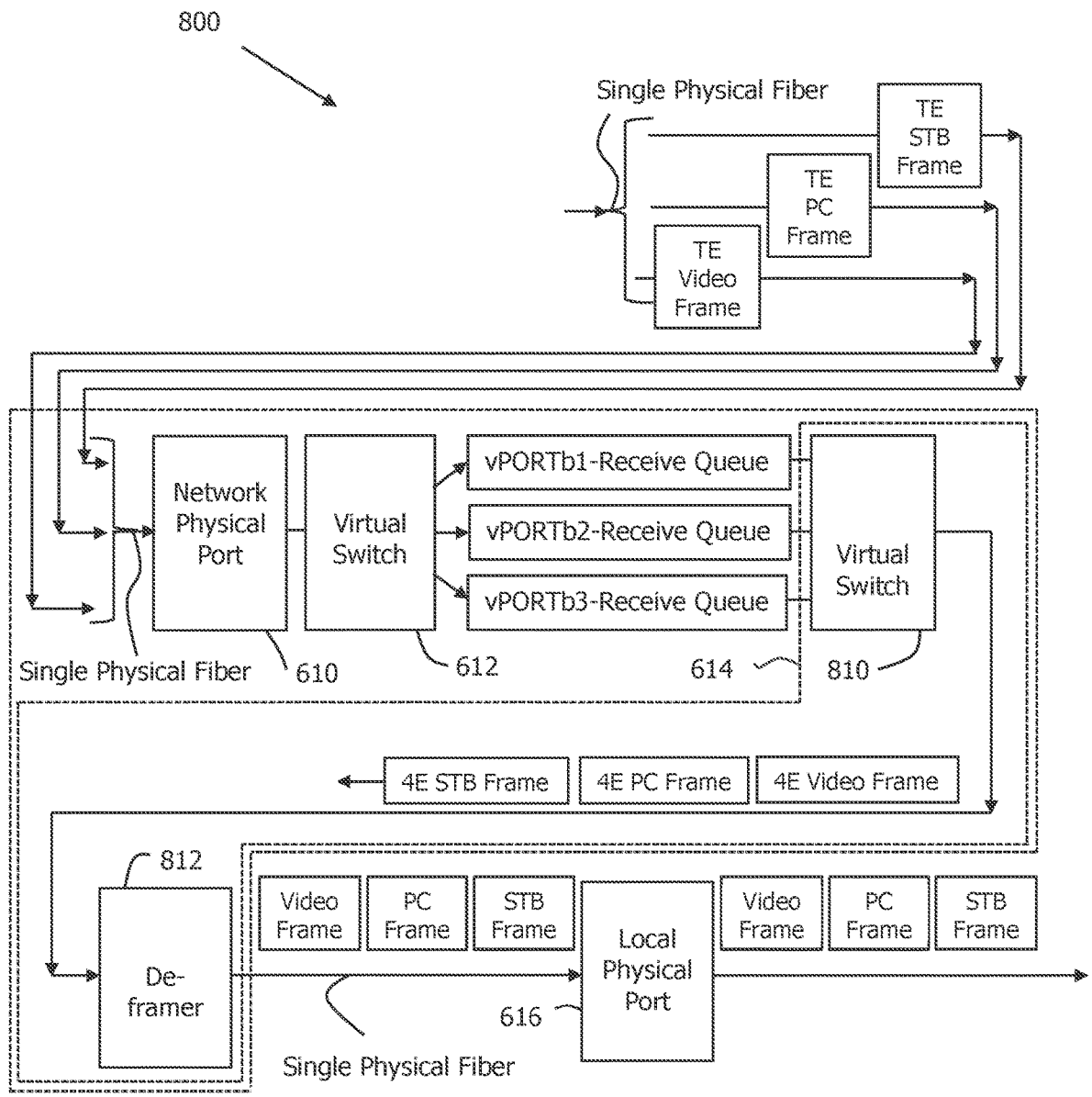
FIG. 8 is a block diagram illustrating an example of a receive circuit 800 in accordance with an alternate embodiment of the present invention.

FIG. 8 shows a block diagram that illustrates an example of a receive circuit 800 in accordance with an alternate embodiment of the present invention. Receive circuit 800 is similar to receive circuit 600 and, as a result, utilizes the same reference numerals to designate the structures that are common to both circuits.

As shown in FIG. 8, receive circuit 800 differs from receive circuit 600 in that framing circuit 614 of receive circuit 800 includes a parallel-to-serial virtual switch 810 that is coupled to the virtual ports vPORTb1-vPORTbn, followed by a serial-to-serial de-framer 812. The implementations of framing circuit 212 and de-framing circuit 614 can be interchanged. For example, virtual network device 100 can utilize framing circuit 212 implemented with virtual switch 220 and framer 222, while de-framing circuit 614 can be implemented with virtual switch 810 and de-framer 812.

In a further alternate embodiment, virtual switch 810 and de-framer 812 can be physically separated, with de-framer 812 being incorporated into a local router/switch.

Figure 9:
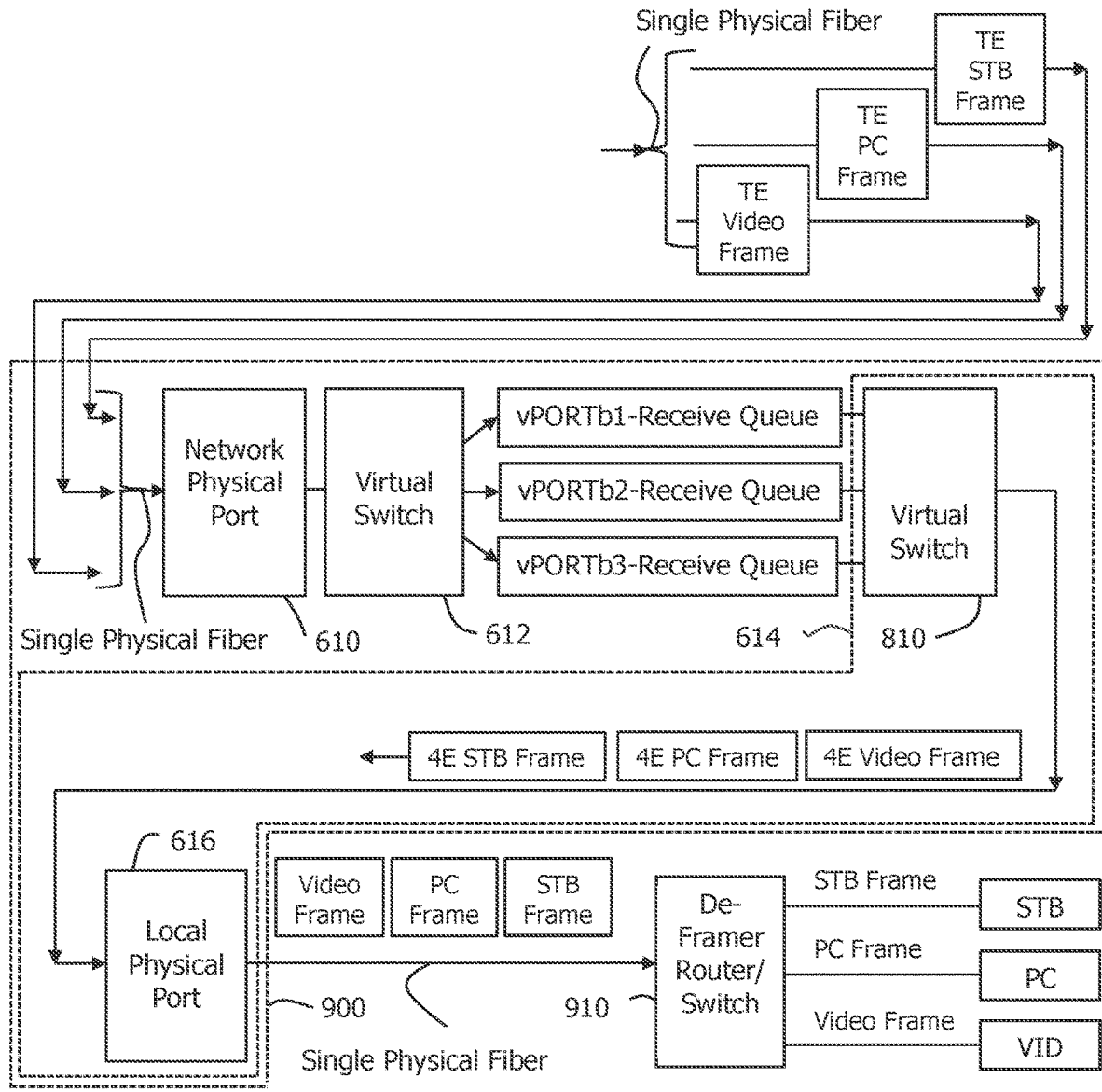
FIG. 9 is a block diagram illustrating an example of a receive circuit 900 in accordance with an alternate embodiment of the present invention.

FIG. 9 shows a block diagram that illustrates an example of a receive circuit 900 in accordance with the present invention. Receive circuit 900 is similar to receive circuit 800 and, as a result, utilizes the same reference numerals to designate the structures that are common to both circuit 800 and circuit 900. As shown in the example illustrated in FIG. 9, a local de-framer router/switch 910 is utilized in receive circuit 900 in lieu of a local router switch.

One of the advantages of the present invention is that the present invention combines multiple streams of STB, PC, and video frames into a single virtual frame stream via a number of virtual ports which, in turn, effectively increases the number of available physical ports.

Reference has now been made in detail to the various embodiments of the present disclosure, examples of which are illustrated in the accompanying drawings. While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims.

Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

It is noted that although a method may be depicted herein as a sequence of numbered operations for clarity, the numbering does not necessarily dictate the order of the operations. It should be understood that some of the operations may be skipped, performed in parallel, or performed without the requirement of maintaining a strict order of sequence.

The drawings showing various embodiments in accordance with the present disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the figures is arbitrary for the most part. Generally, the various embodiments in accordance with the present disclosure can be operated in any orientation.

Some portions of the detailed descriptions are presented in terms of procedures, logic blocks, processing, and other symbolic representations of operations on data bits within a computer memory. These descriptions and representations are used by those skilled in the data processing arts to effectively convey the substance of their work to others skilled in the art.

In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to the action and processes of a computer system, or similar electronic computing device or processor.

The computing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the method of the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

What is claimed is:

1. A virtual network device, comprising:
    a framing circuit configured to:
        receive a plurality of input frames;
        examine the plurality of input frames to determine a frame type for each input frame;
        determine a virtual exit device associated with the each input frame based on the frame type; and
        encapsulate the plurality of input frames to form a plurality of first encapsulated frames;
    a plurality of transmit virtual ports coupled to the framing circuit, wherein the plurality of transmit virtual ports is configured to:
        determine a plurality of next hops in a virtual network for the plurality of first encapsulated frames based on the virtual exit devices corresponding to the plurality of first encapsulated frames; and
        encapsulate the plurality of first encapsulated frames to form a plurality of second encapsulated frames; and
    a transmit virtual switch configured to selectively couple one or more of the plurality of the transmit virtual ports to a network physical port based on whether a full signal from the one or more of the plurality of transmit virtual ports has been received by the transmit virtual switch.

2. The virtual network device of claim 1, wherein the transmit virtual switch is further configured to determine whether the full signal from the one or more of the plurality of transmit virtual ports has been received by the transmit virtual switch, and wherein the full signal indicates that at least a second encapsulated frame in the one or more of the plurality of transmit virtual ports is ready to be transmitted.

3. The virtual network device of claim 2, wherein the transmit virtual switch is configured to selectively couple the one or more of the plurality of transmit virtual ports to the network physical port by forwarding at least the second encapsulated frame from the transmit virtual port that outputs the full signal to the network physical port.

4. The virtual network device of claim 1, wherein each virtual exit device comprises a receive virtual port, wherein the plurality of first encapsulated frames comprises a plurality of headers, and wherein the plurality of headers identifies a plurality of virtual exit devices corresponding to the plurality of input frames.

5. The virtual network device of claim 1, wherein each second encapsulated frame comprises a header, and wherein the header of a second encapsulated frame identifies a next hop of the second encapsulated frame based on a next hop of a first encapsulated frame and the receive virtual port of the associated virtual exit device of an input frame.

6. The virtual network device of claim 1, wherein the transmit virtual switch is configured to:
    sequentially receive a full signal from a first transmit virtual port, a second transmit virtual port, and a third transmit virtual port; and
    output a sequence of second encapsulated frames, wherein a first second encapsulated frame is from the first transmit virtual port, a second second encapsulated frame is from the second transmit virtual port, and a third second encapsulated frame is from the third transmit virtual port.

7. The virtual network device of claim 1, wherein the transmit virtual switch is configured to cycle through the plurality of transmit virtual ports sequentially forwarding a second encapsulated frame from each transmit virtual port in a fixed repeating order to output a series of second encapsulated frames.

8. The virtual network device of claim 1, wherein the framing circuit comprises:
    a virtual switch configured to:
        determine a route for a frame to a transmit virtual port based on the frame type; and
        output the frame towards the transmit virtual port; and
    a framer coupled to the virtual switch, wherein the framer is configured to:
        encapsulate the input frames; and
        execute a protocol from a group of protocols comprising a provider backbone bridge-traffic engineering (PBB-TE) protocol and a transfer multiprotocol listing switch (T-MPLS) protocol.

9. The virtual network device of claim 1, wherein the plurality of transmit virtual ports includes a first portion of a shared memory.

10. The virtual network device of claim 9, further comprising:
    a receive physical port configured to:
        receive a plurality of third encapsulated frames;
        examine the plurality of third encapsulated frames to determine a plurality of frame destinations;
        compare the plurality of frame destinations to a stored destination; and
        forward the third encapsulated frames with matching destinations as matching encapsulated frames, the plurality of third encapsulated frames and matching encapsulated frames having a plurality of headers, and the plurality of headers having a plurality of receive virtual port identifiers;
    a receive virtual switch coupled to the receive physical port, wherein the receive virtual switch is configured to switchably pass the matching encapsulated frames based on the receive virtual port identifiers in the headers of the matching encapsulated frames;
    a plurality of receive virtual ports coupled to the receive virtual switch, wherein the plurality of receive virtual ports is configured to unpack the switchably-passed matching encapsulated frames to extract a plurality of fourth encapsulated frames from the plurality of matching encapsulated frames such that each receive virtual port unpacks a matching encapsulated frame to extract a fourth encapsulated frame, the receive virtual ports including a second portion of the shared memory; and
    a de-framing circuit coupled to the plurality of receive virtual ports, wherein the de-framing circuit is configured to unpack the plurality of fourth encapsulated frames to extract a plurality of output frames from the plurality of fourth encapsulated frames, the plurality of output frames having a plurality of frame types, and each output frame having a header that identifies a destination router/switch.

11. The virtual network device of claim 10, wherein:
    the de-framing circuit comprises a de-framer configured to:
        receive the fourth encapsulated frames from the plurality of receive virtual ports; and
        unpack the fourth encapsulated frames to extract the input frames, and
    the framing circuit is further configured to output the input frames to a local router/switch.

12. A method of operating a virtual network device, the method comprising:
- receiving a plurality of input frames;
- examining the plurality of input frames to determine a frame type for each input frame;
- determining a virtual exit device associated with the each input frame based on the frame type;
- encapsulating the plurality of input frames to form a plurality of first encapsulated frames;
- determining a plurality of next hops in a virtual network for the plurality of first encapsulated frames based on the virtual exit devices corresponding to the plurality of first encapsulated frames;
- encapsulating the plurality of first encapsulated frames in a plurality of transmit virtual ports to form a plurality of second encapsulated frames; and
- selectively coupling one or more of the plurality of transmit virtual ports to a network physical port based on whether a full signal from the one or more of the plurality of transmit virtual ports has been received by a transmit virtual switch.

13. The method of claim 12, further comprising determining whether the full signal from the one or more of the plurality of transmit virtual ports has been received by the transmit virtual switch, wherein the full signal indicates that at least a second encapsulated frame in the one or more of the plurality of transmit virtual ports is ready to be transmitted.

14. The method of claim 13, wherein selectively coupling the one or more of the plurality of transmit virtual ports to the network physical port comprises forwarding at least the second encapsulated frame from the transmit virtual port that outputs the full signal to the network physical port.

15. The method of claim 12, wherein each virtual exit device comprises a receive virtual port, wherein the plurality of first encapsulated frames comprises a plurality of headers, and wherein the plurality of headers identifies a plurality of virtual exit devices corresponding to the plurality of input frames.

16. The method of claim 12, wherein each second encapsulated frame comprises a header, and wherein the header of a second encapsulated frame identifies a next hop of the second encapsulated frame based on a next hop of a first encapsulated frame and the receive virtual port of the associated virtual exit device of an input frame.

17. The method of claim 12, wherein the plurality of transmit virtual ports includes a first portion of a shared memory, and wherein the method further comprises:
- receiving a plurality of third encapsulated frames;
- examining the plurality of third encapsulated frames to determine a plurality of frame destinations;
- comparing the plurality of frame destinations to a stored destination;
- forwarding the third encapsulated frames with matching destinations as matching encapsulated frames, the plurality of third encapsulated frames and matching encapsulated frames having a plurality of headers, and the plurality of headers having a plurality of receive virtual port identifiers;
- switchably passing the matching encapsulated frames based on the receive virtual port identifiers in the headers of the matching encapsulated frames;
- unpacking the switchably-passed matching encapsulated frames in a plurality of receive virtual ports to extract a plurality of fourth encapsulated frames from the plurality of matching encapsulated frames such that each receive virtual port unpacks a matching encapsulated frame to extract a fourth encapsulated frame, the receive virtual ports including a second portion of the shared memory; and
- unpacking the plurality of fourth encapsulated frames to extract a plurality of output frames from the plurality of fourth encapsulated frames, the plurality of output frames having a plurality of frame types, and each output frame having a header that identifies a destination router/switch.

18. A non-transitory computer-readable storage medium having embedded therein program instructions, which when executed by a processor cause the processor to execute a method of operating a virtual network device, the method comprising:
- receiving a plurality of input frames;
- examining the plurality of input frames to determine a frame type for each input frame;
- determining a virtual exit device associated with the each input frame based on the frame type;
- encapsulating the plurality of input frames to form a plurality of first encapsulated frames;
- determining a plurality of next hops in a virtual network for the plurality of first encapsulated frames based on the virtual exit devices corresponding to the plurality of first encapsulated frames;
- encapsulating the plurality of first encapsulated frames in a plurality of transmit virtual ports to form a plurality of second encapsulated frames; and
- selectively coupling one or more of the plurality of transmit virtual ports to a network physical port based on whether a full signal from the one or more of the plurality of transmit virtual ports has been received by a transmit virtual switch.

19. The media of claim 18, wherein the method further comprises determining whether the full signal from the one or more of the plurality of transmit virtual ports has been received by the transmit virtual switch, wherein the full signal indicates that at least a second encapsulated frame in the one or more of the plurality of transmit virtual ports is ready to be transmitted.

20. The medium of claim 18, wherein the plurality of transmit virtual ports includes a first portion of a shared memory, and wherein the method further comprises:
- receiving a plurality of third encapsulated frames;
- examining the plurality of third encapsulated frames to determine a plurality of frame destinations;
- comparing the plurality of frame destinations to a stored destination;
- forwarding the third encapsulated frames with matching destinations as matching encapsulated frames, the plurality of third encapsulated frames and matching encapsulated frames having a plurality of headers, and the plurality of headers having a plurality of receive virtual port identifiers;
- switchably passing the matching encapsulated frames based on the receive virtual port identifiers in the headers of the matching encapsulated frames;
- unpacking the switchably-passed matching encapsulated frames in a plurality of receive virtual ports to extract a plurality of fourth encapsulated frames from the plurality of matching encapsulated frames such that each receive virtual port unpacks a matching encapsulated frame to extract a fourth encapsulated frame, the receive virtual ports including a second portion of the shared memory; and
- unpacking the plurality of fourth encapsulated frames to extract a plurality of output frames from the plurality of fourth encapsulated frames, the plurality of output frames having a plurality of frame types, and each output frame having a header that identifies a destination router/switch.

* * * * *